(12) United States Patent
Bühler et al.

(10) Patent No.: US 9,012,566 B2
(45) Date of Patent: Apr. 21, 2015

(54) POLYAMIDE MOULDING COMPOSITIONS BASED ON MIXTURES MADE OF TRANSPARENT COPOLYAMIDES AND OF ALIPHATIC HOMOPOLYAMIDES FOR PRODUCING TRANSPARENT MOULDINGS

(75) Inventors: Friedrich Severin Bühler, Thusis (CH); Sepp Bass, Domat/Ems (CH)

(73) Assignee: EMS-Patent AG, Dormat/Ems (CH)

( * ) Notice: Subject to any disclaimer, the term of this patent is extended or adjusted under 35 U.S.C. 154(b) by 27 days.

(21) Appl. No.: 13/293,360

(22) Filed: Nov. 10, 2011

(65) Prior Publication Data
US 2012/0142810 A1 Jun. 7, 2012

(30) Foreign Application Priority Data
Dec. 2, 2010 (EP) .................................. 10 193 510

(51) Int. Cl.
*C08G 69/26* (2006.01)
*C08L 77/06* (2006.01)
(52) U.S. Cl.
CPC ............... *C08G 69/265* (2013.01); *C08L 77/06* (2013.01); *C08L 2205/02* (2013.01)
(58) Field of Classification Search
USPC .................................. 524/538, 607; 528/288
See application file for complete search history.

(56) References Cited

U.S. PATENT DOCUMENTS

| 2009/0306308 A1* | 12/2009 | Blondel et al. ................. 525/420 |
| 2011/0040023 A1* | 2/2011 | Buhler et al. ................. 524/538 |
| 2011/0171408 A1* | 7/2011 | Saillard et al. ............... 428/36.9 |

FOREIGN PATENT DOCUMENTS

| DE | 100 09 756 A1 | 9/2001 |
| EP | 2 060 607 A * | 5/2009 |
| WO | 2009/132989 A2 | 11/2009 |

OTHER PUBLICATIONS

European Search Report for EP 10 19 3510, dated Apr. 29, 2011.

* cited by examiner

*Primary Examiner* — Tae H Yoon
(74) *Attorney, Agent, or Firm* — Sughrue Mion, PLLC

(57) ABSTRACT

A polyamide molding composition is described comprising the following components (A)-(C) in the following composition, where the entirety of components (A), (B) and (C) gives 100% by weight:

(A) from 25 to 75% by weight of at least one transparent copolyamide composed of
 (a) from 50 to 90 mol % of a cycloaliphatic diamine selected from the group consisting of: bis(4-amino-3-methylcyclohexyl)methane (MACM), bis(4-aminocyclohexyl)methane (PACM), bis(4-amino-3-ethylcyclohexyl)methane (EACM), bis(4-amino-3,5-dimethylcyclohexyl)methane (TMACM) and mixtures thereof and
 (b) from 10 to 50 mol % of an unbranched, aliphatic diamine,
  based in each case on the total amount of diamines, and also
 (c) of one or more aliphatic and cycloaliphatic dicarboxylic acid(s),
(B) from 25 to 75% by weight of at least one further polyamide of PAXY type, where X and Y can assume, independently of one another, the values from 9 to 14,
(C) from 0 to 10% by weight of additives.

27 Claims, No Drawings

US 9,012,566 B2

POLYAMIDE MOULDING COMPOSITIONS BASED ON MIXTURES MADE OF TRANSPARENT COPOLYAMIDES AND OF ALIPHATIC HOMOPOLYAMIDES FOR PRODUCING TRANSPARENT MOULDINGS

TECHNICAL FIELD

The present invention relates to novel polyamide moulding compositions which feature markedly better processability, in particular in the injection moulding process, good chemicals resistance, very good transparency and low haze.

PRIOR ART

WO-A-2009/132989 discloses transparent copolyamides based on renewable raw materials, where these exhibit low distortion in a test under defined conditions of temperature and humidity (55° C./95% rel. humidity). The copolyamides are produced from cycloaliphatic and aliphatic diamines, and also from aliphatic diacids. The said copolyamides have good haze and good transparency, but haze can increase for example on ageing in alcohols, and the chemicals resistance of the said copolyamides is therefore inadequate. The examples describe only the copolyamides themselves, but the general description makes general reference to the possibility of admixing other polymers, but without making any disclosure of specific systems of this type together with proportions in this type of mixture.

DE 100 09 756 A1 describes polyamide mixtures with improved transparency and chemicals resistance without any sacrifice of mechanical properties. The mixtures are composed of amorphous or microcrystalline polyamides and of semicrystalline polyamides, and also of two different phosphorus additives. The formula stated for the amorphous or microcrystalline polyamide permits a great variety of possible combinations of diamines and of aliphatic dicarboxylic acids as starting components. However, no specific combination of two different diamines or of two different diacids is described. The examples describe amorphous polyamides based always on only one diamine, bis(4-amino-3-methylcyclohexyl)methane (MACM), in combination with one aromatic dicarboxylic acid, isophthalic acid (IPS), and lactam-12.

BRIEF DESCRIPTION OF THE INVENTION

As explained above, the invention provides novel polyamide moulding compositions which feature markedly better processability, in particular in the injection moulding process, than the materials of the prior art, together with good chemicals resistance, very good transparency and low haze.

The invention therefore in particular relates to novel moulding compositions based on mixtures made of transparent copolyamides and of specific semicrystalline, aliphatic homopolyamides, where these are used for producing transparent mouldings, in particular injection mouldings complying with stringent technical requirements and having high-quality surfaces, in particular in the visible region. The expression homopolyamides here has the usual meaning: polyamide systems which are based only on one lactam or respectively only on one diacid monomer and on one diamine monomer, and the said expression therefore includes not only systems such as PA12 but also systems such as PA1012. Other features of the moulding compositions according to the invention are high toughness, low water absorption and good chemicals resistance. The present invention further provides processes for producing polyamide moulding compositions of this type and mouldings produced from the moulding compositions, an example being a material for the casing or display of mobile phones, GPS equipment, MP3 players, spectacles, lenses, cameras, optical equipment and binoculars, etc.

High-quality surfaces are used to support "high end quality" positioning of automobile fittings, of household equipment, of consumer electronics, of sport equipment and of easy-clean industrial surfaces. To this end, stringent requirements are placed upon the material, which must not only have the high-quality appearance but also be resistant to breakage, flowable and extensible, and resistant to distortion. This requires that volume changes due to crystallization are small and that moisture absorption is small. Excellent abrasion resistance and dynamic strength are also demanded, these being typical properties of extensible polyamides. Mouldings made of the polyamide moulding compositions according to the invention have excellent transparency, toughness and abrasion resistance. Properties which give the said mouldings applications in robust environments are in particular high chemical resistance and high resistance to flexural stress cycles. The moulding compositions according to the invention can be processed by known processes on known processing plants to give high-quality mouldings. As explained above, high-quality mouldings can be used as material for the casing or display of mobile phones, GPS equipment, MP3 players, spectacles, lenses, cameras, optical equipment and binoculars, etc.

One of the objects underlying the invention is therefore to provide moulding compositions which are based on mixtures made of transparent copolyamides and semicrystalline, aliphatic polyamides and which can be used for producing transparent mouldings complying with stringent technical requirements and having high-quality surfaces ("high end quality"), in particular in the visible range, but which differ from the known transparent homopolyamides in not having the high glass transition temperatures that are disadvantageous for processing. The moulding compositions are intended to feature high toughness, low water absorption, good chemicals resistance, in particular with respect to alcohols, and improved processability, in particular in the injection moulding process. Specifically, the present invention therefore provides a polyamide moulding composition based on a mixture made of transparent copolyamides and of semicrystalline, aliphatic polyamides for producing transparent mouldings, in particular injection mouldings with high toughness, low water absorption and good chemicals resistance.

This moulding composition is composed of the following components (A)-(C), constituted as follows:

(A) from 25 to 75% by weight of at least one transparent copolyamide composed of
  (a) from 50 to 90 mol % of a cycloaliphatic diamine selected from the group consisting of: bis(4-amino-3-methylcyclohexyl)methane (MACM), bis(4-aminocyclohexyl)methane (PACM), bis(4-amino-3-ethylcyclohexyl)methane (EACM), bis(4-amino-3,5-dimethylcyclohexyl)methane (TMACM) and mixtures thereof and
  (b) from 10 to 50 mol % of an unbranched, aliphatic diamine having from 9 to 14 carbon atoms or a mixture thereof,
  based in each case on the total amount of diamines, and also
  (c) of one or more aliphatic and cycloaliphatic dicarboxylic acid(s) having from 10 to 36 carbon atoms, (B) from 25 to 75% by weight of at least one further polyamide of PAXY type, where X and Y can assume, independently of one another, the values from 9 to 14, (C) from 0 to 10% by weight of additives selected from the group consisting of: UV stabilizers, heat stabilizers, free-radical scavengers, processing aids, inclusion inhibitors, lubricants, mould-release auxiliaries, plasticizers, functional additives for influencing optical properties, in particular refractive index, impact modifiers, fillers such as, in particular, nanoscale fillers and/or nanoscale aggregates, optical brighteners, dyes and mixtures thereof, where the entirety of components (A), (B) and (C) gives 100% by weight.

Since transparency and haze are of prime importance with respect to the property profile of, and the desired applications for, the transparent polymer mixtures and the transparent mouldings manufactured therefrom, the assessment of chemicals resistance below was based on residual transparency and haze properties after ageing in various environments. To this end, mouldings measuring 100×100×2 mm manufactured via injection moulding were aged in various environments for 60 minutes at room temperature. Transparency and haze to ASTM D1003 were determined after 12 h of drying at RT. It is found here that component A itself or blended with small amounts of up to 20% by weight of component B develops very severe haze after ageing in alcohol or in alcohol-containing hydrocarbons (e.g. E85). On the other hand, component B alone, or a mixture of B with small amounts (up to about 20% by weight) of component A has insufficient transparency for the applications mentioned, even without contact with alcohols, and has unacceptably high haze. Surprisingly, it is specifically only mixtures made of from 25 to 75% by weight of component A and from 75 to 25% by weight of component B that have excellent transparency values and excellent haze values, where these are unimpaired, or only insignificantly impaired, on ageing in alcohols or in alcohol-containing solvents. Transparency of a plaque of thickness 2 mm produced from the transparent moulding composition, measured as light transmittance to ASTM D1003, is preferably above 85%, with particular preference at least 90%, and haze is preferably at most 15%, with particular preference at most 12%. The stiffness values (tensile modulus of elasticity greater than 1300 MPa) and high toughness values (preferably impact resistance at 23° C. and −30° C.: without fracture) achieved are appropriate for the desired use of the moulding compositions according to the invention. Good chemicals resistance is moreover achieved with the mouldings produced from the moulding compositions according to the invention, in particular in contact with alcohols.

Component (B) used comprises a semicrystalline, aliphatic polyamide XY, where X and Y can assume the values from 9 to 14 independently of one another. Component (B) is preferably, and according to a first embodiment, selected from the group consisting of PA1010, PA1012 and PA1212, particular preference being given here to PA1010. According to another preferred embodiment, the solution viscosity $\eta_{rel}$ of the aliphatic polyamides of component (B) is in the range from 1.4 to 2.4, preferably from 1.6 to 2.2 and in particular from 1.7 to 2.0. These values apply to measurements made on a solution of 0.5 g of polymer in 100 ml of m-cresol at 20° C.

In another preferred embodiment, the polymer mixture is composed of from 30 to 70% by weight, particularly preferably from 35 to 65% by weight, of component (A) and of from 70 to 30% by weight, particularly preferably from 65 to 35% by weight, of component (B). The preferred proportion present of the further polyamide of component (B) is therefore in the range from 30 to 70% by weight, preferably in the range from 35 to 65% by weight, with particular preference in the range from 40 to 65% by weight.

Surprisingly, it has in particular been established that mixtures made of the transparent copolyamides MACM 10-36/9-14 10-36, preferably MACM 10-18/10-14 10-18, with particular preference MACM 10-14/10 10-14, and of the semicrystalline, aliphatic polyamides PAXY, in particular of the polyamides PA1010, PA1012 and PA1212, have the properties desired. By way of example, the mixtures made of the polyamide PA1010 and of the copolyamide MACM10/1010 with a proportion of 66 mol % of MACM10 have, over the entire range of constitution (from 30 to 70% by weight of component B) transparency above 91% and haze, measured on plaques of thickness 2 mm, of at most 11%. It is outstanding that, within a wide range of constitution, the transmittance values and haze values are superior even to the corresponding values of pure component (A). Maximum gloss values, measured at an angle of 20°, are about 150%. Gloss values of highly transparent materials exceed 100% because the lower surface also reflects light in addition to the upper surface.

For the purposes of the present application, the light transmittance value which is used as measure of transparency here is always determined by the ASTM D1003 method (CIE-C illuminant). In the experiments cited below, this light transmittance was measured on haze-gard plus equipment from BYK Gardner (DE) on 70×2 mm discs or plaques measuring 60×60×2 mm. The transmittance value is stated for the visible wavelength range defined by CIE-C, i.e. with significant intensities approximately from 400 to 770 nm. The 70×2 mm discs are produced by way of example for this purpose in an Arburg injection moulding machine in a polished mould, with cylinder temperature from 200° C. to 340° C. and mould temperature from 20° C. to 140° C.

The transparent mixtures according to the invention made of transparent copolyamides and of semicrystalline, aliphatic polyamides, and also mouldings produced therefrom, therefore preferably have the light transmittance defined here, and they have microcrystalline morphology. It is preferable that the polymer mixtures according to the invention are polyamide systems which, when processed in high-molecular-weight form and without further constituents, give transparent mouldings, the dimension of the crystallites therefore being below the wavelength of visible light.

The MACM-, PACM-, TMACM- and EACM-based copolyamides used according to the invention, and also the polymer mixtures according to the invention produced therefrom moreover preferably have high transparency over the entire claimed constitutional range, and have only low haze. Specifically, this high transparency and low haze of the polyamide moulding compositions means that the transparency of a plaque of thickness 2 mm produced from the transparent moulding composition, measured as light transmittance to ASTM D1003, is preferably, as mentioned above, above 85%, with particular preference at least 90%, and that haze is preferably at most 15%, with particular preference at most 12%. The polyamide moulding compositions according to the invention feature not only superior transparency and low haze but also no, or only little, impairment of transparency and haze on contact with alcohols. According to the invention, haze after one hour of ageing in alcohols is no higher than 15%, preferably no higher than 12% and very particularly preferably no higher than 5%.

The change in haze values (Δhaze) due to one hour of ageing in alcohols is therefore no greater than 10%, preferably no greater than 6% and very particularly preferably no greater than 3%. ΔHaze is the difference in the haze values of a moulding measured prior to and after one hour of ageing in alcohol or in a mixture of a solvent with alcohol (e.g. E85) at room temperature.

According to another preferred embodiment of the polyamide moulding composition, this is characterized in that the concentration of the cycloaliphatic diamines of component (A) is in the range from 50 to 80 mol %, in particular in the range from 55 to 75 mol %, based on total diamine content, and the concentration used of the unbranched, aliphatic diamine is from 25 to 40 mol %, based on total diamine content.

Component (A) is preferably a transparent copolyamide with a glass transition temperature ($T_g$) of at least 80° C. or in particular at least 85° C., and at most 150° C., composed of at least two diamines that differ from one another and of at least one aliphatic dicarboxylic acid. The diamines are a mixture made of cycloaliphatic and unbranched, aliphatic diamines. The cycloaliphatic diamines (constituent (a) within component (A)) have been selected from the group consisting of: bis(4-amino-3-methylcyclohexyl)methane (MACM), bis(4-aminocyclohexyl)methane (PACM), bis(4-amino-3-ethylcyclohexyl)methane (EACM), and bis(4-amino-3,5-dimethylcyclohexyl)methane (TMACM), whereas the unbranched aliphatic diamines (constituent (b) within component (A)) have preferably been selected from the group of: 1,9-nonanediamine, 1,10-decanediamine, 1,11-undecanediamine, 1,12-dodecanediamine, 1,13-tridecanediamine and 1,14-tetradecanediamine.

In order that the transparent copolyamides used according to the invention have the properties demanded, the concentration of the cycloaliphatic diamines (constituent (a) within component (A)) should therefore preferably be within the concentration range from 50 to 80 mol %, with particular preference within the range from 55 to 75 mol %, based on total diamine content.

According to the invention, the concentration of aliphatic diamine (constituent (b) within component (A)), in particular, as is most preferable, selected as 1,10-decanediamine, is always at least 10 mol %, but preferably at least 20 mol %, and with particular preference at least 32 mol %, based on total diamine content and, therefore preferably being within the range from 20 to 50 mol %, particularly preferably in the range from 25 to 45 mol %, based on total diamine content.

According to another preferred embodiment, the glass transition temperature of the copolyamide (A) is from 90° C. to 135° C., particularly preferably at least 100° C. to 135° C. The glass transition temperature (Tg) of the copolyamide (A) is at least 80° C., preferably at least 85° C., in particular at least 90° C. or 100° C. On the other hand, the glass transition temperature (Tg) of the copolyamide (A) is at most 150° C., preferably at most 135° C. and particularly preferably at most 125° C. The preferred glass transition temperature (Tg) of component (A) is therefore in the range from 80 to 135° C., in particular in the range from 85 to 125° C.

The $T_g$ range of component A is further lowered via admixture of component B. According to the invention, the reduction of the glass transition temperature ($T_g$) in comparison with homopolyamides based on cycloaliphatic diamines, e.g. MACM10, achieves higher flowability of the polymer melt and thus better processability. The inventive polyamide moulding compositions solidify less rapidly (than homopolyamide moulding compositions), and the injection moulding process therefore achieves a qualitatively better surface (smoother surface) and higher weld line strength values, by avoiding flow lines or other artefacts. The polymer mixtures according to the invention can moreover be produced and processed under less aggressive conditions, i.e. at temperatures which are lower by from 10° C. to 40° C., and mouldings manufactured therefrom therefore have markedly fewer inclusions (deriving from the polycondensation process) and markedly less discoloration, this being exceptionally important for transparent materials and applications of these in the optical sector, in particular.

According to another preferred embodiment, the mixture used is made of from 60 to 90 mol % of bis(4-amino-3-methylcyclohexyl)methane (MACM), and/or bis(4-aminocyclohexyl)methane (PACM), and/or bis(4-amino-3-ethylcyclohexyl)methane (EACM), and/or bis(4-amino-3,5-dimethylcyclohexyl)methane (TMACM) and from 10 to 40 mol % of at least one aliphatic diamine having from 9 to 14 carbon atoms, particularly preferably having from 10 to 12 carbon atoms, in particular decanediamine (preferably 1,10-decanediamine), based in each case on the total amount of diamines. According to the invention it is preferable to use the aliphatic diamines 1,10-decanediamine and 1,12-dodecanediamine, and it is particularly preferable here to use, as aliphatic diamine, at least 20 mol %, or at least 30 mol %, of 1,10-decanediamine, based on the total content of aliphatic diamines.

The aliphatic dicarboxylic acids preferably have from 10 to 18 carbon atoms, in particular from 10 to 14 carbon atoms.

The aliphatic diacid used (constituent (c) within component (A)) preferably comprises an acid selected from the group consisting of sebacic acid, undecanedioic acid, dodecanedioic acid, tridecanedioic acid, tetradecanedioic acid, pentadecanedioic acid, hexadecanedioic acid, heptadecanedioic acid, octadecanedioic acid, C36 dimer fatty acid and mixtures thereof, where the aliphatic diacid is in particular composed of at least 20 mol %, preferably at least 30 mol %, particularly preferably at least 50 mol %, of sebacic acid, based on the total amount of diacids, and where the aliphatic diacid is very particularly preferably exclusively sebacic acid.

Copolyamides (A) particularly preferred according to the invention are therefore MACM10/1010, MACM12/1012 and MACM14/1014. PACM, EACM or TMACM can replace the diamine MACM entirely or to some extent. It is preferable that PACM replaces MACM entirely or to some extent, i.e. the following systems are likewise particularly preferred: PACM10/1010, PACM12/1012, PACM14/1014 and mixtures thereof.

One particularly preferred embodiment is characterized in that the copolyamide (A) is MACM10/1010 and component (B) is PA1010.

The polyamide moulding compositions according to the invention preferably comprise: from 35 to 70% by weight of component (A), from 30 to 65% by weight of component (B), and from 0 to 5% by weight of component (C).

It is particularly preferable that the moulding compositions comprise the following proportions of the components: from 40 to 65% by weight of component (A), from 35 to 60% by weight of component (B), and from 0 to 3% by weight of component (C).

The polyamide moulding compositions according to the invention, based on mixtures made of transparent copolyamides and of semicrystalline, aliphatic polyamides can be based mainly on monomers which are accessible from renewable raw materials, where the biocontent of copolyamide (A) and/or of further component (B) to ASTM D6866-068a is at least 50% by weight, in particular from 50 to 85% by weight.

However, the polyamide moulding compositions according to the invention can comprise the usually small proportions (less than 10% by weight, preferably less than 5% by weight, with particular preference less than 3% by weight) of the usual additives (component C). The additives mentioned can be stabilizers, such as UV stabilizers, heat stabilizers, or free-radical scavengers and/or can be processing aids, inclusion inhibitors, lubricants, mould-release auxiliaries, or plasticizers, and/or can be functional additives, preferably for influencing optical properties, in particular an example being refractive index, or can be a combination or mixtures thereof. The moulding compositions can moreover include (as component C) nanoscale fillers and/or nanoscale functional materials, e.g. laminar minerals or metal oxides which increase the refractive index, or optical brighteners or dyes, e.g. photochromic dyes.

For the purposes of the invention, the moulding compositions can moreover comprise fillers and/or aggregates that are familiar to the person skilled in the art, examples being glass fibres, glass beads, carbon fibres, carbon black, graphite, flame retardant, mineral, for example titanium dioxide, calcium carbonate or barium sulphate, or by way of example impact modifiers, such as functionalized polyolefins.

Preferred impact modifiers derived from the group selected from acid-modified ethylene-α-olefin copolymers, ethylene-glycidyl-methacrylic acid copolymers and methacrylate-butadyene-styrene copolymers.

Filler or reinforcing agents can also be added to the moulding compositions according to the invention. In this case, the mouldings produced from the moulding compositions are naturally not necessarily transparent. Reinforcing agents that can be used, alongside glass fibres and carbon fibres, are particularly those based on renewable raw materials and on biocontents above 50%. It is particularly preferable to use natural fibres, e.g. cellulose fibres, hemp fibres, flax fibres, cotton fibres, wool fibres or wood fibres.

Polymer components (A) and (B) are produced in known pressure vessels. A pressure phase is first operated at from 250° C. to 320° C. Depressurization then follows at from 250° C. to 320° C. Devolatilization is carried out at from 260° C. to 320° C. The polyamide moulding composition is then discharged in strand form, cooled to from 5° C. to 80° C. in a water bath, and pelletized. The pellets are dried at 80° C. for 12 hours to a water content below 0.06%. During the drying process with simultaneous agitation of the pellets, additives can be applied to, or sintered on to, the pellets, examples being lubricants, dyes, stabilizers and other additives.

The desired relative viscosity (components (A) and (B)) of from 1.40 to 2.40, preferably from 1.6 to 2.20 and with particular preference from 1.70 to 2.00, measured on a solution of 0.5 g of polymer in 100 ml of m-cresol at 20° C., can be achieved by using a slight excess of from 0.01 to 2 mol % either of the diamine or of the dicarboxylic acids. The regulation process preferably uses from 0.01 to 2.0% by weight, preferably from 0.05 to 0.5% by weight, of monoamine or monocarboxylic acids. Suitable regulators are benzoic acid, acetic acid, propionic acid, stearylamine or a mixture of these. Particular preference is given to regulators having amine groups or having carboxylic acid groups and also comprising stabilizer groups of HALS type or of tert-butyl phenol type, examples being triacetonediamine and ditriacetonediamine derivatives of isophthalic acid.

Suitable catalysts for accelerating the polycondensation reaction are phosphorus-containing acids, such as $H_3PO_2$, $H_3PO_3$, $H_3PO_4$, salts of these, or organic derivatives, where these simultaneously reduce discoloration during processing. The amounts added of the catalysts are in the range from 0.01 to 0.5% by weight, preferably in the range from 0.03 to 0.1% by weight. Suitable antifoams for avoiding foaming during the devolatilization process are aqueous emulsions which comprise amounts in the range from 0.01 to 1.0% by weight, preferably in the range from 0.01 to 0.10% by weight, of silicones or silicone derivatives, for a 10% emulsion.

Amounts of from 0.01 to 0.5% by weight of suitable heat stabilizers or of suitable UV stabilizers can be added to the mixture prior to the polycondensation process. It is preferable to use high-melting-point types. It is particularly preferable to use Irganox 1098. Known mixing processes, in particular extrusion in single- or multiscrew extruders with melt temperatures from 250° C. to 350° C., can be used to provide the transparent moulding compositions according to the invention with additives, examples being stabilizers, lubricants, e.g. paraffin oils or stearates, dyes, fillers, impact modifiers, e.g. terpolymers of ethylene-glycidyl methacrylate, preferably with a refractive index in the range of the moulding compositions according to the invention, or maleic-anhydride-grafted polyethylenes, or propylenes, or reinforcing materials, e.g. glass fibres or glass beads or nanoparticles that can be dispersed to give a transparent material, or a mixture of the additives.

The present invention moreover provides a process for producing these polyamide moulding compositions, and the abovementioned object is further achieved via the claimed process for producing these polyamide moulding compositions. It is preferable here to produce polymer components (A) and (B) in known pressure vessels with a pressure phase at from 250° C. to 320° C., with subsequent depressurization at from 250° C. to 320° C., with subsequent devolatilization at from 260° C. to 320° C., and discharge of the polyamide moulding compositions in strand form, cooling, pelletization and drying of the pellets, compounding of components (A) and (B), and optionally (C) in the form of pellets, and moulding in an extruder at melt temperatures from 220° C. to 350° C. to give a strand, cutting by suitable pelletizers to give pellets, where additives can be added during the compounding process, where these are desirable for providing properties to the moulding composition, examples being processing stabilizers, colour pigments, UV absorbers, heat stabilizers, flame retardants and other transparent polyamides.

Processes suitable for producing high-transparency mouldings from the transparent polyamide moulding compositions according to the invention are therefore injection moulding processes and injection compression moulding processes at melt temperatures from 230° C. to 320° C., where the mould is adjusted to temperatures from 40° C. to 130° C. and where, if appropriate, the mould at temperatures from 40° C. to 130° C. exerts compression on the hot moulding after material has been charged to the cavity. An expansion injection compression moulding process is a particularly suitable process for producing defect-free, low-stress surfaces of the moulding made of the transparent polyamide moulding compositions according to the invention, examples being lenses for spectacles or high-quality casing parts, where materials are charged to cavities with wall thicknesses of from 1 to 5 mm and then, while charging of material continues, the mould cavity is enlarged to give higher wall thicknesses.

Processes suitable for producing foils, pipes and semifinished products of single- or multilayer design made of the transparent polyamide moulding compositions according to the invention are extrusion processes in single- or multiscrew extruders with melt temperatures from 250° C. to 350° C., where suitable adhesion promoters in the form of appropriate copolymers or blends can be used as rendered necessary by compatibility of the various layers.

Mouldings composed of the polyamide moulding compositions according to the invention can be bonded to one another by conventional processes, for example via ultrasound welding, incandescent-wire welding, frictional welding, spin welding or laser welding via provision of laser-active dyes with absorption in the range from 800 nm to 2000 nm.

Suitable processes for producing hollow bodies and bottles of single- or multilayer design made of the transparent polyamide moulding composition according to the invention are injection blow moulding processes, injection stretch blow moulding processes and extrusion blow moulding processes.

The moulding compositions according to the invention can also be processed to give foils, e.g. flat foils, blown foils, cast foils, and multilayer foils. Further processing of the foils preferably uses lamination, in-mould coating, stretching, orientation, printing or dyeing. Mouldings can be bulk-dyed or coloured subsequently by means of what are known as dip baths. Optional mechanical working of mouldings uses milling, drilling, grinding, laser marking, laser cutting and/or laser welding.

Suitable uses for mouldings composed of the transparent polyamide moulding compositions according to the invention are inspection windows for technical heating equipment with direct contact with oil, filter cups for treatment of drinking water, baby bottles, bottles for carbonation, crockery, flow meters for gases or liquids, clock casings, casings for wristwatches, lamp casings or reflectors for automobile lamps.

The present invention therefore also provides the claimed mouldings made of these polyamide moulding compositions, where these are preferably produced by the process cited above. In other words, the abovementioned object is also achieved via these mouldings obtainable from the polyamide moulding compositions described above, preferably produced by means of injection moulding processes and injection compression moulding processes at melt temperatures from 230° C. to 320° C., where the mould is adjusted to temperatures from 40° C. to 130° C. and where, if appropriate, the mould at temperatures from 40° C. to 130° C. exerts compression on the hot moulding after material has been charged to the cavity.

The stiffness values of the mouldings produced from the unreinforced moulding compositions according to the invention are moduli of elasticity of from 1300 to 2000 MPa, preferably moduli of elasticity of from 1400 to 1800 MPa. When Charpy impact values of test specimens are measured, no fracture of the test specimens occurs at room temperature (23° C.) or at −30° C.

These mouldings are therefore preferably produced by using injection moulding processes and injection compression moulding processes at melt temperatures of from 230° C. to 320° C., where the mould is adjusted to temperatures from 40° C. to 130° C. and where, if appropriate, the mould at temperatures from 40° C. to 130° C. exerts compression on the hot moulding after material has been charged to the cavity.

This moulding is preferably characterized by light transmittance of at least 85%, preferably at least 88% and particularly preferably at least 90%, measured to ASTM D1003, determined on plaques measuring 2×60×60 mm or on discs measuring 2×70 mm, at a temperature of 23° C., with hazegard plus test equipment from Byk Gardner with CIE illuminant C.

Preference is further given to this moulding characterized in that the haze of a plaque of thickness 2 mm produced from the transparent polyamide moulding composition according to the present invention after one hour of ageing in alcohols, measured to ASTM D1003, is at most 15%, preferably at most 12% and very particularly preferably at most 5%.

The moulding can assume a very wide variety of forms, for example being a foil, pipe or semifinished product, or a hollow body or bottle, etc. This moulding particularly preferably concerns an element of a casing or of a display, therefore preferably concerning such an element of a machine, of an automobile, of household equipment, or of in particular portable electrical or electronic equipment, for example in particular of a mobile phone, computer, laptop, GPS device, MP3 player, camera, optical device or a combination thereof, or the moulding can concern sports equipment, a spectacle frame, a spectacle lens or other lens, a binocular or elements thereof, or else can concern the other components mentioned above.

The dependent claims cite further embodiments.

DESCRIPTION OF PREFERRED EMBODIMENTS

The invention will now be explained in more detail by using the examples below, but is not restricted thereto.

Example IE1

Transparent Copolyamide MACM10/1010 (66:34)

16.93 kg of bis(4-amino-3-methylcyclohexyl)methane, 6.30 kg of decanediamine, 21.76 kg of sebacic acid and 18 kg of water are charged to a 130 L pressure autoclave. A pressure phase is first operated at 290° C. Depressurization then follows at 280° C., and this is followed by the devolatilization process at the same temperature. Once the desired torque has been achieved, the polyamide moulding composition is discharged in strand form, cooled in a water bath and pelletized. The pellets are dried at 80° C. for 12 h to a water content below 0.06%.

Examples IE2 to IE6 and Comparative Example CE1 to CE4

The untreated polymer IE2 is compounded in accordance with Table 2 in a twin-screw extruder from Werner and Pfleiderer with screw diameter 25 mm using prescribed process parameters (barrel temperature: 260° C., screw rotation rate: 200 rpm, throughput: 10 kg/h) to produce polymer blends IE2 to IE6, and also CE1 to CE3. To this end, all components of Tables 1 and 2 are premixed and metered by way of a balance into the intake of the twin-screw extruder. If appropriate, the melt is subjected to a small degree of devolatilization by a stream of nitrogen in zone 10. The product is drawn off in the form of strand from a dye of diameter 3 mm, and is pelletized. The pellets are dried at 80° C. for 24 hours under a vacuum of 30 mbar.

High-transparency mouldings or test specimens were produced from the transparent polyamide moulding compositions according to the invention in an Arburg 420 C Allrounder 1000-250 injection moulding machine at melt temperatures from 230° C. to 280° C., where the mould was set to a temperature of 40° C. or 60° C. Screw rotation rate was from 150 to 400 rpm.

Tables 1 and 2 list the properties of the resultant materials or mouldings.

TABLE 1

|  | Unit | IE2 | IE3 | IE4 | IE5 |
|---|---|---|---|---|---|
| Constitution | | | | | |
| B1 (MACM10/1010) | % by weight | 69.3 | 59.3 | 49.3 | 39.3 |
| PA1010 | % by weight | 30.0 | 40.0 | 50.0 | 60.0 |
| Heat and UV stabilizers | % by weight | 0.7 | 0.7 | 0.7 | 0.7 |
| Properties | | | | | |
| MVR (275° C./5 kg) | ccm/10 min | 30 | 30 | 26 | 26 |
| Glass transition temperature ($T_g$) | ° C. | 82 | 70 | 63 | 54 |
| Melting point | ° C. | 194 | 195 | 196 | 197 |
| Enthalpy of fusion | J/g | 19.2 | 31.3 | 43.8 | 49.3 |
| Relative viscosity | — | 1.809 | 1.814 | 1.826 | 1.834 |
| Tensile modulus of elasticity | MPa | 1600 | 1560 | 1520 | 1410 |
| Ultimate tensile strength | MPa | 38 | 48 | 47 | 34 |
| Tensile strain at break | % | 100 | 190 | 210 | 160 |
| Charpy impact resistance, 23° C. | kJ/m$^2$ | nf | nf | nf | nf |
| Charpy impact resistance, −30° C. | kJ/m$^2$ | nf | nf | nf | nf |
| Charpy notched impact resistance, 23° C. | kJ/m$^2$ | 9.5 | 9.2 | 9.5 | 10.6 |
| Light transmittance to ASTM D1003 | % | 93 | 93 | 93 | 93 |
| Gloss 20° | % | 151 | 151 | 153 | 151 |
| Gloss 60° | % | 146 | 145 | 148 | 140 |
| Flow path length | mm | 169 | 174 | 182 | 192 |
| Haze to ASTM D1003 | | | | | |
| Prior to ageing | % | 1.2 | 1.2 | 1.5 | 1.6 |
| After ageing in methanol | % | 3.6 | 2.3 | 1.5 | 1.5 |
| After ageing in ethanol | % | 9.8 | 1.5 | 1.5 | 1.6 |
| After ageing in 2-propanol | % | 2.9 | 2.2 | 1.4 | 1.7 |
| After ageing in spirit | % | 9.3 | 1.2 | 1.6 | 1.6 |
| After ageing in E85 | % | 4.4 | 1.4 | 1.5 | 1.5 |

TABLE 2

|  | Unit | IE6 | CE1 | CE2 | CE3 | CE4 |
|---|---|---|---|---|---|---|
| Constitution | | | | | | |
| B1 (MACM10/1010) | % by weight | 29.3 | 99.3 | 79.3 | 19.3 | 9.3 |
| PA1010 | % by weight | 70.0 | 0 | 20.0 | 80.0 | 90.0 |
| Heat and UV stabilizers | % by weight | 0.7 | 0.7 | 0.7 | 0.7 | 0.7 |
| Properties | | | | | | |
| MVR (275° C./5 kg) | ccm/10 min | 31 | 32 | 32 | 28 | 33 |
| Glass transition temperature ($T_g$) | ° C. | 46 | 114 | 92 | 35 | 30 |
| Melting point | ° C. | 198 | — | 186 | 198 | 199 |
| Enthalpy of fusion | J/g | 55.9 | — | 3.1 | 60.6 | 66.9 |
| Relative viscosity | — | 1.835 | 1.775 | 1.802 | 1.846 | 1.847 |
| Tensile modulus of elasticity | MPa | 1430 | 1650 | 1630 | 1580 | 1690 |
| Ultimate tensile strength | MPa | 45 | 52 | 54 | 45 | 38 |
| Tensile strain at break | % | 210 | 150 | 190 | 190 | 150 |
| Charpy impact resistance, 23° C. | kJ/m$^2$ | nf | nf | nf | nf | nf |
| Charpy impact resistance, −30° C. | kJ/m$^2$ | nf | nf | nf | nf | nf |
| Charpy notched impact resistance, 23° C. | kJ/m$^2$ | 6.4 | 8.8 | 6.3 | 6.9 | 6.4 |
| Light transmittance to ASTM D1003 | % | 92 | 93 | 93 | 82 | 75 |
| Gloss 20° | % | 133 | 149 | 153 | 86 | 108 |
| Gloss 60° | % | 127 | 142 | 147 | 95 | 106 |
| Flow path length | mm | 196 | 160 | 163 | 210 | 225 |
| Haze to ASTM D1003 | | | | | | |
| Prior to ageing | % | 10 | 1.6 | 1.4 | 74 | 36 |
| After ageing in methanol | % | 10 | 39 | 16 | 72 | 36 |
| After ageing in ethanol | % | 11 | 86 | 54 | 70 | 37 |
| After ageing in 2-propanol | % | 16 | 92 | 16 | 71 | 37 |

TABLE 2-continued

|  | Unit | IE6 | CE1 | CE2 | CE3 | CE4 |
|---|---|---|---|---|---|---|
| After ageing in spirit | % | 12 | 78 | 55 | 74 | 36 |
| After ageing in E85 | % | 14 | 80 | 39 | 71 | 36 | nf: no fracture

Relative viscosity ($\eta_{rel}$) was determined to DIN EN ISO 307 on solutions of 0.5 g of polymer in 100 ml of m-cresol at a temperature of 20° C.

Glass transition temperature ($T_g$), melting point ($T_m$) and enthalpy of fusion ($H_m$) were determined to ISO 11357-1/2. The heating rate used for differential scanning calorimetry (DSC) was 20K/min.

Tensile modulus of elasticity, ultimate tensile strength and tensile strain at break were determined to ISO 527 with a tensile testing speed of 1 mm/min (tensile modulus of elasticity) or 50 mm/min (ultimate tensile strength, tensile strain at break) on an ISO tensile specimen, standard: ISO/CD 3167, Al type, 170×20/10×4 mm, temperature 23° C. Charpy impact resistance and notched impact resistance were measured to ISO 179/keU on an ISO test specimen, standard: ISO/CD 3167, B1 type, 80×10×4 mm, temperature −30° C. and 23° C.

Light transmittance (transparency) and haze were determined to ASTM D1003 on plaques measuring 2×60×60 mm or on discs measuring 2×70 mm, at a temperature of 23° C., with haze-gard plus test equipment from Byk Gardner using CIE illuminant C. The light transmittance values are stated in % of incident luminous energy.

Gloss was measured to DIN EN ISO 2813 on a 70×2 mm disc at a temperature of 23° C. at an angle of 20° and 60° with a Minolta Multi Gloss 268.

MVR (melt volume rate) was determined to ISO 1133 at 275° C. with a load of 5 kg.

Flow path lengths were determined by means of an Arburg-injection moulding machine (ARBURG—ALLROUNDER 320-210-750). 1.5 mm×10 mm flow spirals were produced with melt temperature 250° C. and mould temperature 40° C.

Mouldings made of the polymer mixtures according to the invention have good mechanical properties and adequate thermal properties. The mouldings according to the invention have superior transparency (transmittance), which is above the values of pure component (A) over a wide range of constitution of the polymer mixtures. By way of example, the transparency of the polymer mixtures IE1 to IE6 assumes values of from 91 to 93%, although only component (A), as amorphous copolyamide, is transparent and component (B), as semicrystalline polyamide, is non-transparent.

The haze of IE1 to IE5 is excellent and is at least equivalent to the haze of CE1. For high proportions of component (B), haze then rises to values of about 12%. IE6, with 70% by weight content of (B), still achieves acceptable haze: about 10. The moulding compositions according to the invention moreover also have good mechanical resistance, in particular to alcohols. By way of example, the haze of IE1 to IE6 does not increase, or increases only slightly, after ageing in alcohols or in alcohol-containing fuel (E85 comprising 15% of ethanol), whereas haze is markedly impaired in the case of CE1 and CE2. CE3 and CE4 have unacceptably high haze values even without alcohol contact, and have insufficient transparency: 75 and 82%.

The invention claimed is:

1. A polyamide moulding composition based on a mixture of transparent copolyamides and of semicrystalline, aliphatic polyamides for producing transparent mouldings, where the moulding composition comprises:

(A) from 25 to 75% by weight of at least one transparent copolyamide exclusively consisting of
 (a) from 50 to 90 mol % of bis(4-amino-3-methylcyclohexyl)methane (MACM) and
 (b) from 10 to 50 mol % of 1,10-decanediamine,
 based in each case on the total amount of diamines, and also
 (c) of one or more aliphatic dicarboxylic acid(s) selected from the group consisting of sebacic acid and dodecanoic diacid or mixtures thereof, (B) from 25 to 75% by weight of at least one further polyamide selected from the group consisting of: PA1010, PA1012, or mixtures thereof, (C) from 0.01 to 5% by weight of additives comprising stabilizers selected from the group consisting of UV stabilizers or heat stabilizers or a mixture of UV stabilizers and heat stabilizers and a material selected from the group consisting of: free-radical scavengers, processing aids, inclusion inhibitors, lubricants, mould-release auxiliaries, plasticizers, functional additives for influencing optical properties, impact modifiers, fillers and/or aggregates, optical brighteners, dyes and mixtures thereof, where the entirety of components (A), (B) and (C) gives 100% by weight, and wherein the haze of a plaque of thickness 2 mm produced from said polyamide moulding composition after one hour of ageing in alcohols, measured to ASTM D1003, is at most 5%.

2. The polyamide moulding compositions according to claim 1, wherein component (B) is PA1010.

3. The polyamide moulding composition according to claim 1, wherein the proportion present of the further polyamide of component (B) is in the range from 30-70% by weight.

4. The polyamide moulding composition according to claim 1, wherein the solution viscosity $\eta_{rel}$ of the further polyamide of component (B), measured on a solution of 0.5 g of polymer in 100 ml of m-cresol at 20° C., is in the range from 1.4 to 2.4.

5. The polyamide moulding composition according to claim 1, wherein the concentration of the MACM of component (A) is in the range from 50 to 80 mol %, based on total diamine content, and the concentration used of the 1,10-decanediamine is from 25 to 40 mol %, based on total diamine content.

6. The polyamide moulding composition according to claim 1, wherein the glass transition temperature of the copolyamide (A) is at least 85° C.

7. The polyamide moulding composition according to claim 1, wherein the copolyamide (A) is selected from the group consisting of: MACM10/1010 and MACM12/1012.

8. The polyamide moulding composition according to claim 1, wherein the copolyamide (A) is MACM10/1010 and component (B) is PA1010.

9. A process for producing a polyamide moulding composition based on a mixture of transparent copolyamides and of semicrystalline, aliphatic polyamides for producing transparent mouldings, where the moulding composition comprises:
- (A) from 25 to 75% by weight of at least one transparent copolyamide exclusively consisting of
  - (a) from 50 to 90 mol % of bis(4-amino-3-methylcyclohexyl)methane (MACM) and
  - (b) from 10 to 50 mol % of 1,10-decanediamine,
    based in each case on the total amount of diamines, and also
  - (c) of one or more aliphatic dicarboxylic acid(s) selected from the group consisting of sebacic acid and dodecanoic diacid or mixtures thereof,
- (B) from 25 to 75% by weight of at least one further polyamide selected from the group consisting of: PA1010, PA1012, or mixtures thereof,
- (C) from 0.01 to 5% by weight of additives comprising stabilizers selected from the group consisting of UV stabilizers or heat stabilizers or a mixture of UV stabilizers and heat stabilizers and a material selected from the group consisting of: free-radical scavengers, processing aids, inclusion inhibitors, lubricants, mould-release auxiliaries, plasticizers, functional additives for influencing optical properties, impact modifiers, fillers and/or aggregates, optical brighteners, dyes and mixtures thereof, where the entirety of components (A), (B) and (C) gives 100% by weight, and wherein the haze of a plaque of thickness 2 mm produced from said polyamide moulding composition after one hour of ageing in alcohols, measured to ASTM D1003, is at most 5%, wherein polymer components (A) and (B) are produced in pressure vessels with a pressure phase at from 250° C. to 320° C. with subsequent depressurization at from 250° C. to 320° C., with subsequent devolatilization at from 260° C. to 320° C., and discharge of the polyamide moulding compositions in strand form, cooling, pelletization and drying of the pellets, compounding of components (A) and (B), and (C) in the form of pellets and moulding in an extruder at melt temperatures from 220° C. to 350° C. to give a strand, cutting by suitable pelletizers to give pellets, where additives can be added during the compounding process, where these are desirable for providing properties to the moulding composition.

10. A moulding obtained from a polyamide moulding composition based on a mixture of transparent copolyamides and of semicrystalline, aliphatic polyamides for producing transparent mouldings, where the moulding composition comprises:
- (A) from 25 to 75% by weight of at least one transparent copolyamide exclusively consisting of
  - (a) from 50 to 90 mol % of bis(4-amino-3-methylcyclohexyl)methane (MACM) and
  - (b) from 10 to 50 mol % of 1,10-decanediamine,
    based in each case on the total amount of diamines, and also
  - (c) of one or more aliphatic dicarboxylic acid(s) selected from the group consisting of sebacic acid and dodecanoic diacid or mixtures thereof,
- (B) from 25 to 75% by weight of at least one further polyamide selected from the group consisting of: PA1010, PA1012, or mixtures thereof,
- (C) from 0.01 to 5% by weight of additives comprising stabilizers selected from the group consisting of UV stabilizers or heat stabilizers or a mixture of UV stabilizers and heat stabilizers and a material selected from the group consisting of: free-radical scavengers, processing aids, inclusion inhibitors, lubricants, mould-release auxiliaries, plasticizers, functional additives for influencing optical properties, impact modifiers, fillers and/or aggregates, optical brighteners, dyes and mixtures thereof, where the entirety of components (A), (B) and (C) gives 100% by weight, and wherein the haze of a plaque of thickness 2 mm produced from said polyamide moulding composition after one hour of ageing in alcohols, measured to ASTM D1003, is at most 5%, wherein the moulding is obtained by means of injection moulding processes and injection compression moulding processes at melt temperatures from 230° C. to 320° C., where a mould is adjusted to temperatures from 40° C. to 130° C. and where, if appropriate, the mould at temperatures from 40° C. to 130° C. exerts compression on the hot moulding after material has been charged to the cavity.

11. The moulding according to claim 10, characterized by light transmittance of at least 85%, measured to ASTM D1003, determined on plaques measuring 2×60×60 mm or on discs measuring 2×70 mm, at a temperature of 23° C., with haze-gard plus test equipment from Byk Gardner with CIE illuminant C.

12. The moulding according to claim 10, wherein it concerns an element for the casing or display of a machine, of an automobile, of household equipment, or of electrical or electronic equipment, optical device or a combination thereof, or concerns sports equipment, a spectacle frame, a spectacle lens or other lens, a binocular, inspection windows for technical heating equipment with direct contact with oil, filter cups for treatment of drinking water, baby bottles, bottles for carbonation, crockery, flow meters for gases or liquids, clock casings, casings for wristwatches, lamp casings or reflectors for automobile lamps or elements thereof.

13. The polyamide moulding according to claim 1, wherein the additives include at least one functional additive for influencing optical properties.

14. The polyamide moulding composition according to claim 1, wherein the proportion present of the further polyamide of component (B) is in the range from 40-65% by weight.

15. The polyamide moulding composition according to claim 1, wherein the solution viscosity $\eta_{rel}$ of the further polyamide of component (B), measured on a solution of 0.5 g of polymer in 100 ml of m-cresol at 20° C., is in the range from 1.7 to 2.0.

16. The polyamide moulding composition according to claim 1, wherein the concentration of the MACM of component (A) is in the range from 55 to 75 mol %, based on total diamine content, and the concentration used of the 1,10-decanediamine is from 25 to 40 mol %, based on total diamine content.

17. The polyamide moulding composition according to claim 1, wherein the aliphatic dicarboxylic acid is composed of at least 50 mol %, of sebacic acid.

18. The polyamide moulding composition according to claim 1, wherein the dicarboxylic acid of component (A) is exclusively sebacic acid.

19. The polyamide moulding composition according to claim 1, wherein the glass transition temperature of the copolyamide (A) is at least 100° C. to 135° C.

20. The polyamide moulding composition according to claim 2, wherein the glass transition temperature of the copolyamide (A) is at least 100° C. to 135° C.

21. The polyamide moulding composition according to claim 3, wherein the glass transition temperature of the copolyamide (A) is at least 100° C. to 135° C.

22. The polyamide moulding composition according to claim 4, wherein the glass transition temperature of the copolyamide (A) is at least 100° C. to 135° C.

23. The polyamide moulding composition according to claim 5, wherein the glass transition temperature of the copolyamide (A) is at least 100° C. to 135° C.

24. A process for producing a polyamide moulding composition based on a mixture of transparent copolyamides and of semicrystalline, aliphatic polyamides for producing transparent mouldings, where the moulding composition comprises:
    (A) from 25 to 75% by weight of at least one transparent copolyamide exclusively consisting of
       (a) from 50 to 90 mol % of bis(4-amino-3-methylcyclohexyl)methane (MACM) and
       (b) from 10 to 50 mol % of 1,10-decanediamine,
          based in each case on the total amount of diamines, and also
       (c) of one or more aliphatic dicarboxylic acid(s) selected from the group consisting of sebacic acid and dodecanoic diacid or mixtures thereof,
    (B) from 25 to 75% by weight of at least one further polyamide selected from the group consisting of: PA1010, PA1012, or mixtures thereof,
    (C) from 0.01 to 5% by weight of additives comprising stabilizers selected from the group consisting of UV stabilizers or heat stabilizers or a mixture of UV stabilizers and heat stabilizers and a material selected from the group consisting of: free-radical scavengers, processing aids, inclusion inhibitors, lubricants, mould-release auxiliaries, plasticizers, functional additives for influencing optical properties, impact modifiers, fillers and/or aggregates, optical brighteners, dyes and mixtures thereof,
    where the entirety of components (A), (B) and (C) gives 100% by weight, and
    wherein the haze of a plaque of thickness 2 mm produced from said polyamide moulding composition after one hour of ageing in alcohols, measured to ASTM D1003, is at most 5%,
    wherein polymer components (A) and (B) are produced in pressure vessels with a pressure phase at from 250° C. to 320° C. with subsequent depressurization at from 250° C. to 320° C., with subsequent devolatilization at from 260° C. to 320° C., and discharge of the polyamide moulding compositions in strand form, cooling, pelletization and drying of the pellets, compounding of components (A) and (B), and (C) in the form of pellets and moulding in an extruder at melt temperatures from 220° C. to 350° C. to give a strand, cutting by suitable pelletizers to give pellets, wherein the additives are added during the compounding process.

25. The moulding according to claim 10, characterized by light transmittance of at least 90%, measured to ASTM D1003, determined on plaques measuring 2×60×60 mm or on discs measuring 2×70 mm, at a temperature of 23° C., with haze-gard plus test equipment from Byk Gardner with CIE illuminant C.

26. The moulding according to claim 10, wherein it concerns an element for the casing or display of a portable electrical or electronic equipment, selected from the group consisting of: mobile phone, computer, laptop, GPS device, MP3 player, camera, and optical device.

27. A polyamide moulding composition based on a mixture of transparent copolyamides and of semicrystalline, aliphatic polyamides for producing transparent mouldings, where the moulding composition comprises:
    (A) from 25 to 75% by weight of at least one transparent copolyamide exclusively consisting of
       (a) from 50 to 90 mol % of bis(4-amino-3-methylcyclohexyl)methane (MACM) and
       (b) from 10 to 50 mol % of 1,10-decanediamine,
          based in each case on the total amount of diamines, and also
       (c) sebacic acid,
    (B) from 25 to 75% by weight of PA1010,
    (C) from 0.01 to 3% by weight of additives comprising stabilizers selected from the group consisting of UV stabilizers or heat stabilizers of a mixture of UV stabilizers and heat stabilizers and a material selected from the group consisting of: free-radical scavengers, processing aids, inclusion inhibitors, lubricants, mould-release auxiliaries, plasticizers, functional additives for influencing optical properties, impact modifiers, fillers and/or aggregates, optical brighteners, dyes and mixtures thereof,
    where the entirety of components (A), (B) and (C) gives 100% by weight, and
    wherein the haze of a plaque of thickness 2 mm produced from said polyamide moulding composition after one hour of ageing in alcohols, measured to ASTM D1003, is at most 5%.

* * * * *